Sept. 29, 1970  F. A. HALS  3,531,664
MEANS FOR AND METHOD OF REMOVING POLLUTANTS
FROM PRODUCTS OF COMBUSTION
Filed Nov. 7, 1968
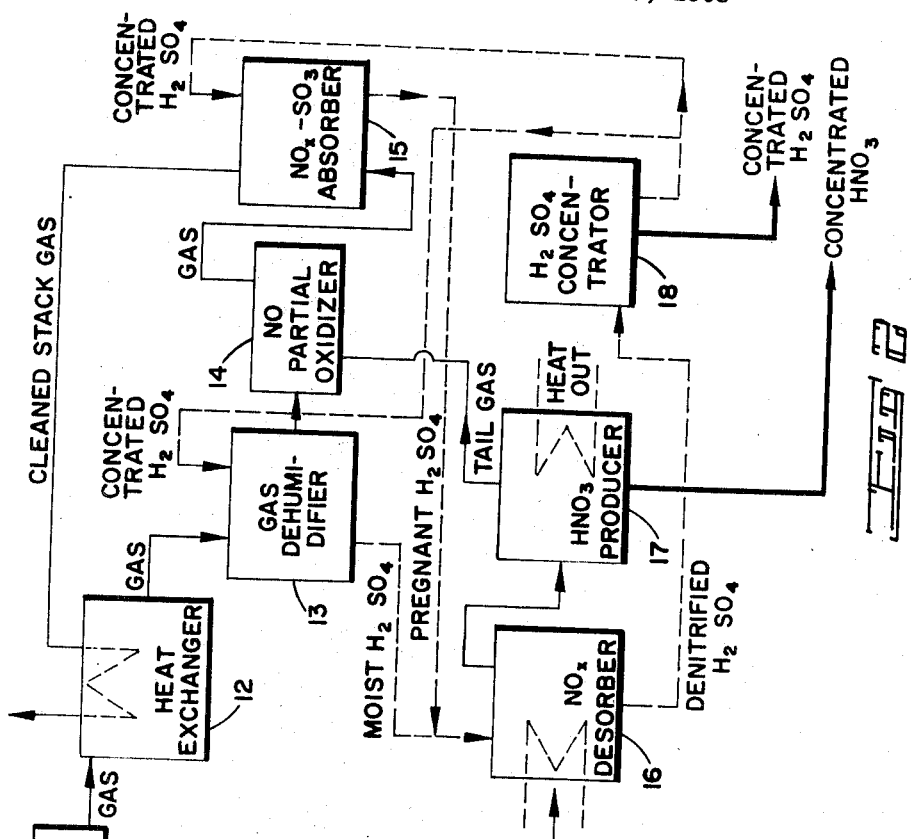
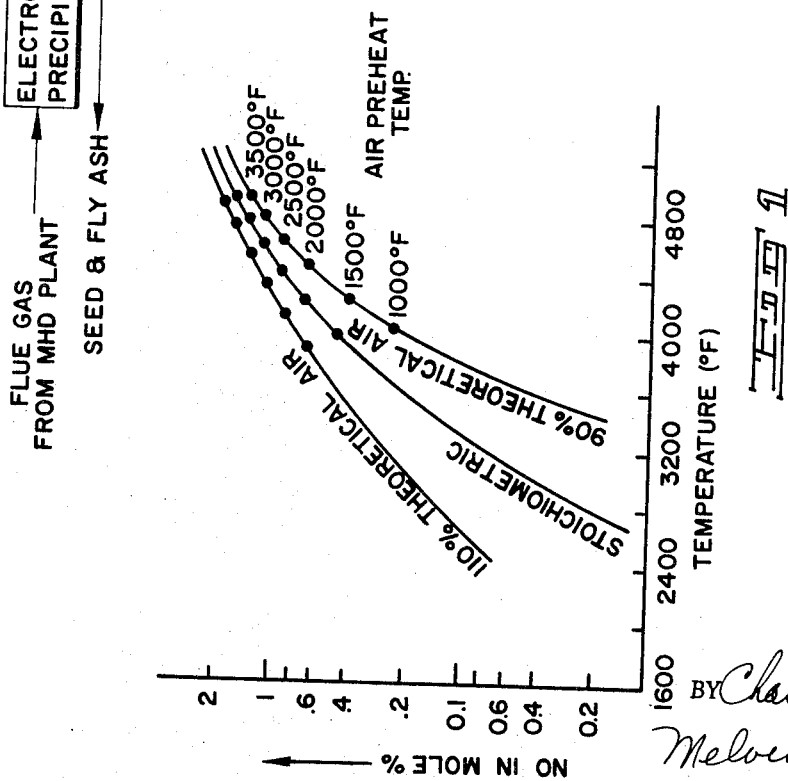
FINN A. HALS
INVENTOR.
BY Charles M. Hogan
Melvin E. Frederick
ATTORNEYS

United States Patent Office 3,531,664
Patented Sept. 29, 1970

3,531,664
MEANS FOR AND METHOD OF REMOVING POLLUTANTS FROM PRODUCTS OF COMBUSTION
Finn A. Hals, Lexington, Mass., assignor to Avco Corporation, Cincinnati, Ohio, a corporation of Delaware
Filed Nov. 7, 1968, Ser. No. 774,135
Int. Cl. H02n 4/02
U.S. Cl. 310—11       9 Claims

ABSTRACT OF THE DISCLOSURE

In a magnetohydrodynamic power generating system means for and a method of removing oxides of nitrogen and oxides of sulfur from the combustion of fossil fuel comprising partial oxidation of nitric oxide (NO) in the gas to nitrous oxide ($NO_2$) and oxidation of $SO_2$ to $SO_3$ with the nitrogen oxides in the gas, subsequent absorption of the oxides of sulfur and nitrogen in sulfuric acid and final conversion into concentrated sulfuric acid and nitric acid.

---

This invention relates to means for and a method of removing pollutants from products of combustion and more particularly to the recovery of nitric oxide (NO) and sulfur dioxide ($SO_2$) produced from burning coal as fuel in a magnetohydrodynamic (hereinafter referred to as "MHD") electrical generating system.

If air containing molecular nitrogen and oxygen is heated to a very high temperature, a small percentage of NO is formed according to the reaction: $N_2+O_2 \rightleftharpoons 2NO$. The equilibrium percentage of NO formed is a function of temperature. Thus as the temperature increases, the percentage of NO formed also increases. As is also well known in the art of thermal fixation of atmospheric nitrogen, if the hot gas containing the NO is cooled very rapidly, the NO does not have time to decompose and the high temperature equilibrium concentration of NO is frozen or "fixed." The more rapid the cooling, the higher the yield of NO.

MHD generators which operate with carbonaceous fuel, preheated air and alkali vapor seeding require stagnation temperatures in excess of 2500° K. because the electrical conductivity due to thermal ionization is otherwise insufficient for economical power generation. Under such conditions, atmospheric nitrogen and oxygen react to form NO. As pointed out hereinabove, stabilization against decomposition requires that the gaseous mixture be quenched at a rapid rate from these high temperatures and it has been found that NO freezes as the working fluid expands in the MHD channel while producing electric power. Thus, in prior art open cycle MHD power plants using fossil fuel as the energy source, NO is present in the exhaust gas.

Stabilizing NO against decomposition requires that the gaseous mixture be quenched from its initial high temperature at a very rapid rate. A sufficiently fast quenching rate can be attained both in the expansion nozzle and the channel of an MHD generator while producing power. The temperature drop across the expansion nozzle and MHD generator is sufficient to stabilize a substantial portion of the NO in the products of combustion comprising the working gas.

In the electric arc process, for the production of NO, the air is heated to a high temperature, such as, for example, 3500° K., by an electric arc and the hot air is then cooled by heat exchange with cold air. This method of heat exchange is a relatively slow process and accordingly resulted in commercially impractical low yields of NO. Thus, the prior art electric arc process has been considered too costly for commercial purposes and accordingly, over the years, the electric arc process fell into disfavor and attention was directed to the pebble bed process.

In the pebble bed process, the heating is by combustion of fuel with air first preheated in a pebble bed and the cooling is by heat transfer to the pebbles of a second pebble bed. Cooling a gas by contact with a solid surface, while much faster than the heat exchange method through solids, is still relatively slow and the operating temperature is limited by the construction materials.

For a more thorough discussion of all aspects of the electric arc process including the patent and factual history thereof, reference is made to "Fixed Nitrogen" by H. A. Curtis, American Chemical Society Monograph, the Chemical Catalog Company, Inc. (1932); for a thorough discussion of the pebble bed process, reference is made to "Wisconsin Process Pebble Bed Furnace Fixed Atmospheric Nitrogen" by E. D. Ermenc, Chemical Engineering Progress, volume 52, No. 4, pages 149–153, April 1956; and for an improvement in the electric arc process, reference is made to patent application, Ser. No. 392,779, filed Aug. 28, 1964, and assigned to the same assignee as this application.

In conventional electrical generating plants utilizing rotating generators, NO and $SO_2$ in the exhaust gases are considered to be pollutants and efforts are made to prevent the generation of NO and $SO_2$. The principal methods of preventing the fixation of NO is to maintain not more than a stoichiometric mixture of fuel and oxygen or air as the case may be and to avoid rapid cooling of the products of combustion. The principal method of preventing or at least maintaining the generation of $SO_2$ at as low a level as possible is to use more expensive fossil fuel with little or no sulfur.

Roughly 20 million tons of pollutants are presently emitted to the atmosphere from combustion of fossil fuel in central station power plants. Considering that the amount of electric energy derived from fossil fuel alone is expected to double by the year 1980 and further redouble by the year 2000, it would appear that improved air pollution control of the effluent gas from fossil fuel power plants is urgently needed. The major pollutants produced by the burning of fossil fuel in central station power plants today are oxides of sulfur, but oxides of nitrogen and particulate matter are also present in significant quantities. Carbon monoxide and hydrocarbons are also of concern although to a much lesser degree than the other pollutants.

The amount of effluent gas emitted from a power plant is reduced in direct proportion of the expected increase in efficiency. Therefore, total stack gas emission from an MHD power plant can be as much as one third less than that from a conventional power plant of the same capacity. Furthermore, particulate matter in the effluent gas will be removed by electrostatic precipitation because of the economic necessity of recovering the alkali seed impurity added to enhance the electrical conductivity of the combustion gases. For a further discussion of means for and a method of recovering particulate matter in the form of alkalis from products of combustion in an MHD generator, reference is made to Pat. No. 3,303,364, issued Feb. 7, 1967, and assigned to the same assignee.

In accordance with the present invention, it has been found that the MHD process is particularly adapted to economic and efficient removal of oxides of sulfur and nitrogen in the gas formed during the combustion of the fuel. This feature is unique to the MHD process because of the ability of the MHD generator to handle high temperature combustion gases and to extract electrical energy directly from these gases. As previously noted, the MHD generator takes advantage of the highest flame temperatures which can be produced from the combustion of fossil fuel. The combustion driven MHD generator operates with flame temperatures in excess of 4000° F., whereas the maximum temperature reached in conventional furnaces is roughly 3000° F. Because of the higher flame temperatures attained in the MHD combustion process, the NO equilibrium concentration in the burner is higher than that in a conventional furnace. The relationship of NO equilibrium concentrations in combustion products from fossil fuel as a function of temperature and combustion conditions is shown in FIG. 1 which illustrates the increase in the equilibrium concentration of NO with increasing flame temperatures reached by burning coal with different air preheat temperatures for stoichiometric, fuel rich, and fuel lean combustion. Inspection of FIG. 1 shows that in an MHD combustion process, the NO equilibrium in the high temperature burner can be epexted to be as high as 1 to 1½% NO.

The exact mechanism and the kinetics involved in the formation and decomposition of NO in combustion gases containing ash and seed impurities is somewhat uncertain. However, it is known that the concentration of NO appearing in the effluent gas from an MHD electrical generating plant is strongly influenced by the combustion process, stoichiometry of the fuel-air mixture, temperature-time history of the gas and gas composition.

Broadly, two routes are available for control of NO emission. These are:

(a) To maximize the oxides of nitrogen in the effluent so that recovery of fixed nitrogen becomes economically attractive.

(b) To minimize the oxides of nitrogen in the effluent so that it is acceptable for direct emission to the atmosphere.

Experiments have demonstrated that NO equilibrium concentrations of MHD combustion systems can readily be attained in the MHD combustion chamber when flame temperatures in excess of 4000° F. appropriate to MHD power systems are produced. However, the content of oxides of nitrogen appearing in the cooled stack gas is greatly dependent upon the fuel-air ratio and the combustion process. Thus, when employing slightly fuel rich combustion in the MHD high temperature burner with completion of the combustion at a later stage in the system downstream of the MHD generator, i.e., with completion of combustion in the air heater or supplemental boiler, the content of oxides of nitrogen in the stack gas can be reduced to less than 500 parts per million, a level comparable with or less than that of present fossil fueled power plants where NO concentrations between 100–1500 parts per million have been measured. Fuel rich combustion enhances the decay of NO formed during the combuston because less oxygen is available and reducing agents are formed in the gas. Thus, in order to attain a lower level of oxides of nitrogen in the stack gas, the combustion in the MHD burner should occur slightly fuel rich with completion of the combustion of the fuel downstream of the MHD generator. This is practical in an MHD system which provides a precise control of a combustion process in separate and relatively small, high intensity, pressurized combustion chamber producing homogeneous gas. This also assures complete combustion of the fuel without carbon monoxide, unburned carbon or hydrocarbon in the effluent gas. This may be contrasted to the huge furnaces of conventional boilers where combustion is coupled with steam generation and nonuniform conditions in the furnace make it difficult to exercise precise control of the combustion.

On the other hand and more importantly, as noted above it is possible to attain from 1 to 1½% NO as fixed nitrogen in the effluent gas by burning with a stoichiometric mixture or with an excess of air in the MHD burner. At such conditions, the rapid expansion and subsequent cooling of the gas in the MHD generator fixes or freezes the amount of NO formed in the burner.

For a more thorough discussion, reference is made to patent application Ser. No. 491,189, filed Sept. 29, 1965, entitled "Method of Supplying Electric Power and Thermal Fixation of Nitrogen" and assigned to the same assignee.

The purposeful generation of maximum contraction of NO in an MHD burner is, in accordance with the invention, combined with removal of sulfur from the gas.

The bulk of sulfur in coal appears in the combustion gases as $SO_2$ which is much more difficult to remove from flue gas than is $SO_3$. $SO_2$ is relatively inactive chemically and it has a very limited solubility in water, whereas $SO_3$ is much more active and dissolves easily in water. However, oxides of nitrogen promote the conversion of $SO_2$ to $SO_3$ and this fact is utilized to effect the removal of both oxides of nitrogen and sulfur from the effluent from an MHD generator. Tests have shown that utilization of NO in MHD combustion gases for the removal of sulfur can result in more than a tenfold reduction in sulfur concentration in the combustion gases. In one case, measured $SO_2$ concentration in stack gas was reduced to as low as 100 parts per million from an initial concentration of 3200 parts per million, the latter concentration corresponding to burning of coal with roughly 4% sulfur.

The general object of the invention is to provide apparatus for and a new efficient method of removing oxides of nitrogen and oxides of sulfur from the effluent gas in a fossil fueled MHD power system.

Another object of the invention is to provide apparatus for and an improved method of magnetohydrodynamically generating electric power and simultaneously producing nitric acid and sulfuric acid.

A further object of the invention is to provide apparatus for and a method of removing oxides of nitrogen and oxides of sulfur from the products of combustion of fossil fuel.

A still further object of the invention is to provide apparatus for and a method of operating an MHD generator wherein the generator may be operated under conditions for producing maximum NO while using cheap coal having a high sulfur content and recovering substantially all of the NO and sulfur.

The novel features that are considered characteristic are set forth in the appended claims; the invention itself, however, both as to its organization and method of operation together with additional objects and advantages thereof will best be understood from the following description of a specific embodiment when read in conjunction with the accompanying drawings, in which:

FIG. 1 is a graphic representation illustrating the increase in the equilibrium concentration of NO with increasing flame temperatures reached by burning coal with different air preheat temperatures for stoichiometric, fuel-rich and fuel lean combustion; and FIG. 2 is a block diagram of apparatus for carrying out the invention.

Attention is now directed to FIG. 2 which is by way of illustration a block diagram of apparatus for removing oxides of nitrogen and sulfur from the combustion products of fossil fuel in an MHD power generating system. As shown in FIG. 2, the flue gas exhausted from an MHD power plant (not shown) is first thoroughly cleaned of particulate matter in preferably highly efficient but conventional electrostatic precipitators 11 typically for recovery of the seed material added to enhance the electrical conductivity of the combustion gases supplied to the MHD generator. For a more thorough discussion of the method of and apparatus for recovery of seed material, reference is made to Pat. No. 3,303,364, issued Feb. 7, 1967.

After removal of preferably substantially all particulate matter from the gas, it is directed to conventional heat exchanger 12 to effect a reduction in temperature to about 100° F. in the event the gas has not previously been reduced to about this temperature at or upstream of the precipitators 11. The flue gas from the precipitators may typically be expected to be at a temperature of about 300° F. and an appropriate desirable inlet temperature of the gas for purposes of the present invention is about 100° F. Returning now to FIG. 2, the cleaned gas at a temperature of about 100° F. is passed through a dehumidifier 13 to remove excess water vapor from the gas. This may be easily accomplished by, for example, scrubbing the gas in a scrubbing tower or the like with concentrated sulfuric acid to absorb water vapor in the gas. In the event the water vapor content of the gas is about 2% or less, as may be the case if a fuel such as char is used, the dehumidifier step may be omitted.

The major portion of the sulfur and the fixed nitrogen in the flue gas appears as $SO_2$ and $NO$ respectively with only smaller amounts present as $SO_3$ and $NO_2$. Another fact significant to the present invention is that $NO_2$ readily oxidizes $SO_2$ to $SO_3$, which is more easily recoverable than $SO_2$ since $SO_3$ is chemically very active in contrast to $SO_2$ which is chemically inactive and difficult to recover or remove from a gas. A further significant fact is that concentrated sulfuric acid can absorb $NO$ as well as $NO_2$ in equal molar concentrations. Accordingly, in accordance with the invention, substantially one-half of the $NO$ in the flue gas is converted to $NO_2$ and the resulting substantially equal molar concentrations of $NO$ and $NO_2$ are absorbed in sulfuric acid. Prior art aqueous absorption systems on the other hand require in a similar situation almost complete if not complete conversion of $NO$ to $NO_2$. The aforementioned oxidation of $NO$ to $NO_2$ (and subsequent conversion of $SO_2$ in the gas to $SO_3$) is accomplished by directing the gas from the dehumidifier 13 to a $NO$ partial oxidizer 14 wherein the necessary substantially 50% conversion is accomplished in conventional manner as with a suitable catalyst such as, for example, activated carbon. The gas exiting from the partial oxidizer 14 (including tail gas more fully described hereinafter) contains concentrations of $NO$ and $NO_2$ whereby substantially all of the aforementioned chemically inactive $SO_2$ can be oxidized by $NO_2$ to chemically active $SO_3$ and still provide substantially equal molar concentrations of $NO$ and $NO_2$. In the event substantial oxidation of the $SO_2$ to $SO_3$ does not occur in the partial oxidizer 14, it will be completed in the $NO_x$–$SO_3$ absorber 15 wherein the gas from the partial oxidizer 14 is brought in contact with concentrated sulfuric acid. Removal of the oxides of nitrogen and sulfur in absorber 15 may be simply accomplished by passing the gas from the partial oxidizer 14 (which gas may contain sulfuric acid in vapor form, $NO$, $NO_2$, $SO_3$, etc.) through a conventional reaction tower or the like using concentrated sulfuric acid as an absorbent. Such sulfuric acid in vapor form as may exist, the oxides of nitrogen and the oxides of sulfur are absorbed in the concentrated sulfuric acid in the absorber 15. The resulting acid, designated "pregnant" sulfuric acid, exiting from the absorber 15 together with the diluted or "moist" sulfuric acid resulting from the absorption of water vapor in the dehumidifier 13 are directed to $NO_x$ desorber means 16 such as a heat exchanger wherein they are mixed and heated to drive off or desorb the oxides of nitrogen previously absorbed in the absorber 15. Dilution and heating of the pregnant acid will both desorb the oxides of nitrogen previously absorbed. The output of the desorber 16 is denitrified sulfuric acid and desorbed gases of oxides of nitrogen of roughly equal molar concentrations. The aforementioned desorbed gases of oxides of nitrogen are directed to conventional nitric acid producing means 17 where they are converted to concentrated nitric acid in conventional manner. The nitric acid producer 17 may typically comprise a conventional nitric acid plant wherein nitric oxides are absorbed in water. The tail gas from the nitric acid plant 17 is preferably recirculated within the system by directing it to the partial oxidizer 14. The recirculation of the tail gas from the nitric acid plant 17 has the advantage of increasing the concentration of oxides of nitrogen in the absorption system and avoids the emission of noxious gases from the nitric plant 17 to the atmosphere. The partial oxidizer 14 is indicated in FIG. 2 as being arranged in the gas stream so that it oxidizes both the incoming flue gas from the dehumidifier 13 and the tail gases from the nitric acid plant 17. However, if desired, oxidizer means may be arranged in either one or both of the aforementioned two gas streams which streams may then be mixed downstream of the oxidizer. The function of the partial oxidizer is to perform the oxidation of $NO$ to $NO_2$ for efficient absorption in sulfuric acid, that is, provide $NO$ and $NO_2$ in substantially equal molar concentrations and provide $NO_2$ for conversion of the $SO_2$ to $SO_3$. The denitrified sulfuric acid from the desorber 16 is directed to a sulfuric acid concentrator 18 to effect concentration of the sulfuric acid. The concentrator may typically comprise conventional apparatus for heating or vacuum drying the acid to drive off or remove the water. One part of the concentrated sulfuric acid from the concentrator is directed to the dehumidifier 13 for dehumidification where necessary of the incoming flue gases as previously described and another part is directed to and utilized in the absorber 15 for absorption of the oxides of nitrogen and sulfur. The gases leaving the absorber 15 which are thoroughly cleaned of oxides of nitrogen and sulfur and which essentially consist of carbon dioxide and nitrogen can harmlessly be emitted to the atmosphere. Since it may be desirable to reheat the cleaned stack gases to attain proper buoyancy the clean stack gas from absorber 15 may be directed to and through the heat exchanger 12 for heating this gas with the incoming warmer flue gas. The products from the system are taken from the nitric acid producer 17 in the form of concentrated nitric acid and from sulfuric acid concentrator 18 in the form of concentrated sulfuric acid, both of which acids are valuable chemicals.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In a method of recovering nitric oxide and sulfur dioxide from a gas comprising products of combustion of carbonaceous fuel, the steps comprising:
   (a) cooling said gas to a low temperature of about 100° F;
   (b) oxidizing nitric oxide in said cooled gas to produce nitrogen dioxide;
   (c) reacting said produced nitrogen dioxide with said sulfur dioxide to convert said sulfur dioxide to sulfur trioxide;
   (d) absorbing in sulfuric acid the nitric oxide, nitrogen dioxide and sulfur trioxide in said reacted gas;
   (e) separating said absorbed nitric oxide and nitrogen dioxide from said sulphuric acid; and
   (f) absorbing in a first material said separated nitric oxide and nitrogen dioxide.

2. The method as defined in claim 1 wherein the amount of nitric oxide oxidized to nitrogen dioxide is sufficient to oxidize substantially all of said sulfur dioxide to sulfur trioxide and thereafter provide substantially equal amounts of nitric oxide and nitrogen dioxide in said reacted gas.

3. The method as defined in claim 2 and additionally including the step of removing water vapor from said gas to provide a water vapor content of about two percent.

4. The method as defined in claim 3 wherein said gas is passed through sulfuric acid to remove said water vapor.

5. The method as defined in claim 4 wherein after absorption in said sulfuric acid said gas is vented to the atmosphere and said absorbed nitric oxide and nitrogen dioxide is separated from said sulfuric acid by heating.

6. The method as defined in claim 5 wherein said first material is water.

7. In the method of operating a magnetohydrodynamic device wherein a high temperature, electrically conductive, high velocity gas including water vapor, nitric oxide and sulfur dioxide comprising the products of combustion of a carbonaceous fuel such as coal is supplied to the gas inlet end of said device, passed between opposed electrodes disposed in and normal to a magnetic field and exhausted from said device at its gas outlet end, the steps comprising:

(a) downstream of said device confining and directing the gas exhausted from said device through a heat exchanger and cooling said gas to a temperature substantially less than said high temperature;

(b) confining and directing said gas from said heat exchanger to an oxidizer and oxidizing nitric oxide to produce nitrogen dioxide;

(c) reacting said produced nitrogen dioxide with said sulfur dioxide to convert substantially all of said sulfur dioxide to sulfur trioxide;

(d) confining and directing said reacted gas to a first absorber and absorbing in sulfuric acid said sulfur trioxide, sulfuric acid formed from the reaction of said water vapor and sulfur trioxide, and the remaining nitric oxide and nitrogen dioxide;

(e) confining and directing said first material from said absorber to a separator and removing substantially all absorbed nitric oxide and nitrogen dioxide; and (f) confining and directing the nitric oxide and nitrogen dioxide from said separator to a first absorber and absorbing in a second material said separated nitric oxide and nitrogen dioxide.

8. The method as defined in claim 7 wherein said gas is cooled to about 100° F.; and the amount of nitric oxide oxidized to nitrogen dioxide is sufficient to oxidize substantially all of said sulfur dioxide to sulfur trioxide and additionally provide substantially equal amounts of nitric oxide and nitrogen dioxide in said reacted gas.

9. The combination as defined in claim 8 wherein said second material is water.

References Cited

UNITED STATES PATENTS

| | | | |
|---|---|---|---|
| 3,379,903 | 4/1968 | Rosner | 310—11 |
| 3,471,723 | 10/1969 | Maslan | 310—11 |

DAVID X. SLINEY, Primary Examiner